United States Patent
Vrcelj et al.

(10) Patent No.: US 8,433,016 B2
(45) Date of Patent: *Apr. 30, 2013

(54) NARROW-BAND INTERFERENCE CANCELLER

(75) Inventors: Bojan Vrcelj, San Diego, CA (US); Ashok Mantravadi, San Diego, CA (US); Fuyun Ling, San Diego, CA (US); Linbo Li, San Diego, CA (US); Raghuraman Krishnamoorthi, San Diego, CA (US); Murali Ramaswamy Chari, San Diego, CA (US); Vinay Murthy, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 139 days.

This patent is subject to a terminal disclaimer.

(21) Appl. No.: 12/780,600

(22) Filed: May 14, 2010

(65) Prior Publication Data

US 2010/0220821 A1  Sep. 2, 2010

Related U.S. Application Data

(63) Continuation of application No. 11/557,035, filed on Nov. 6, 2006, now Pat. No. 7,720,185.

(51) Int. Cl.
*H04B 1/10* (2006.01)
(52) U.S. Cl.
USPC ............ 375/349; 375/260; 375/345; 375/350
(58) Field of Classification Search .................. 375/260, 375/345, 346, 349, 350
See application file for complete search history.

(56) References Cited

U.S. PATENT DOCUMENTS

| 5,295,192 | A | 3/1994 | Hamada et al. |
| 5,400,084 | A | 3/1995 | Scarpa |
| 5,612,975 | A | 3/1997 | Becker et al. |
| 5,654,765 | A | 8/1997 | Kim |
| 6,285,768 | B1 * | 9/2001 | Ikeda .......................... 381/71.11 |
| 6,507,740 | B2 | 1/2003 | Shi |
| 6,785,700 | B2 * | 8/2004 | Masud et al. ................. 708/400 |
| 6,965,658 | B1 | 11/2005 | Lindqvist et al. |
| 7,139,341 | B2 | 11/2006 | Doetsch et al. |
| 7,167,516 | B1 * | 1/2007 | He ................. 375/232 |
| 7,720,185 | B2 * | 5/2010 | Vrcelj et al. .................. 375/349 |

(Continued)

FOREIGN PATENT DOCUMENTS

| JP | 06500217 | 1/1994 |
| JP | 2004080455 A | 3/2004 |

(Continued)

OTHER PUBLICATIONS

Written Opinion—PCT/US07/083594, International Search Authority—European Patent Office, May 26, 2008.

(Continued)

*Primary Examiner* — David B Lugo
(74) *Attorney, Agent, or Firm* — Fulbright & Jaworski L.L.P.

(57) ABSTRACT

The disclosure is directed to a receiver, and methods therefor, including an automatic gain control circuit with a first digital variable gain amplifier that outputs digital samples based on a modulated wireless signal, an interference canceller configured to filter the digital samples using a least mean squares algorithm to reduce narrowband interference, and a second DVGA configured to amplify the filtered digital samples.

68 Claims, 6 Drawing Sheets

U.S. PATENT DOCUMENTS

| | | |
|---|---|---|
| 2002/0196876 A1 | 12/2002 | Takada |
| 2003/0128678 A1* | 7/2003 | Subrahmanya et al. ...... 370/335 |
| 2003/0165205 A1 | 9/2003 | Chu et al. |
| 2003/0207674 A1* | 11/2003 | Hughes ...................... 455/234.1 |
| 2004/0229590 A1 | 11/2004 | Kubo et al. |
| 2005/0097154 A1 | 5/2005 | Tsecouras |
| 2005/0163039 A1* | 7/2005 | Narayan et al. ............... 370/204 |
| 2005/0281290 A1 | 12/2005 | Khandekar et al. |
| 2006/0240782 A1 | 10/2006 | Pollman et al. |

FOREIGN PATENT DOCUMENTS

| | | |
|---|---|---|
| TW | I241069 | 10/2005 |
| TW | I242329 | 10/2005 |
| TW | I242930 | 11/2005 |

OTHER PUBLICATIONS

International Search Report—PCT/US07/083594, International Search Authority—European Patent Office, May 26, 2008.

\* cited by examiner

NARROW-BAND INTERFERENCE CANCELLER

CLAIM OF PRIORITY UNDER 35 U.S.C. §120

The present Application for Patent is a continuation of patent application Ser. No. 11/557,035 entitled "NARROW-BAND INTERFERENCE CANCELLER" filed Nov. 6, 2006, issued as U.S. Pat. No. 7,720,185, and assigned to the assignee hereof and hereby expressly incorporated by reference herein in its entirety.

BACKGROUND

1. Field

The present disclosure relates generally to communication systems, and more particularly, to concepts and techniques for canceling narrow-band interference in a wireless receiver.

2. Background

In a wireless communications system, a transmitter typically processes (e.g., encodes and modulates) data and generates a radio frequency (RF) modulated signal. The transmitter then transmits the modulated signal through a wireless medium to a receiver. As the modulated signal propagates through the wireless medium, it may be subject to noise, interference, and other disturbances.

The function of the receiver is to recover the modulated signal in the presence of these disturbances. The design of the receiver will depend not only on the type of signal to be detected, but the nature of the disturbances. Narrow-band interference, for example, is a type of disturbance that can present unique challenges for a receiver designer. Unless properly filtered, the receiver may be unable to recover the modulated signal.

Narrow-band interference is often a concern in broadcast systems. These systems often operate in the UHF region, and therefore, are susceptible to narrow-band interference from TV signals operating in the same region of the frequency spectrum. Another source of narrow-band interference is other channels, whose interaction due to the non-linearity of the receiver may result in equivalent in-band components. The most common effects in this category are IM2 and IM3 interferers. The second-order non-linearity (IM2) components are generally out of band, except for a DC component which can be cancelled by a DC offset. The IM3 imperfections, however, tend to produce in-band components that can appear anywhere in the baseband signal, depending on the frequency of the narrow-band interference.

There is therefore a need in the art for techniques to cancel narrow-band interference at a wireless receiver.

SUMMARY

One aspect of a receiver is disclosed. The receiver includes an interference canceller configured to filter digital samples produced from a modulated signal transmitted over a wireless channel, and a digital variable gain amplifier (DVGA) configured to amplify the filtered digital samples.

An aspect of a method for canceling interference in a receiver is disclosed. The method includes filtering digital samples produced from a modulated signal transmitted over a wireless channel, and amplifying the filtered digital samples with a variable digital gain.

Another aspect of a receiver is disclosed. The receiver includes means for filtering digital samples produced from a modulated signal transmitted over a wireless channel, and means for amplifying the filtered digital samples with a variable digital gain.

BRIEF DESCRIPTION OF THE DRAWINGS

Various aspects of a wireless communications system are illustrated by way of example, and not by way of limitation, in the accompanying drawings, wherein.

DETAILED DESCRIPTION

The detailed description set forth below in connection with the appended drawings is intended as a description of various configurations of the invention and is not intended to represent the only configurations in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

The concepts and techniques described herein may be used in various wireless communication systems such as cellular systems, broadcast systems, wireless local area network (WLAN) systems, and others. The cellular systems may be Code Division Multiple Access (CDMA) systems, Time Division Multiple Access (TDMA) systems, Frequency Division Multiple Access (FDMA) systems, Orthogonal Frequency Division Multiple Access (OFDMA) systems, Single-Carrier FDMA (SC-FDMA) systems, and other multiple access systems. The broadcast systems may be MediaFLO systems, Digital Video Broadcasting for Handhelds (DVB-H) systems, Integrated Services Digital Broadcasting for Terrestrial Television Broadcasting (ISDB-T) systems, and other broadcast systems. The WLAN systems may be IEEE 802.11 systems, Wi-Fi systems, and others. These systems are known in the art.

The concepts and techniques described herein are well suited for systems with a single subcarrier as well as systems with multiple subcarriers. Multiple subcarriers may be obtained with OFDM, SC-FDMA, or some other modulation technique. OFDM and SC-FDMA partition a frequency band (e.g., the system bandwidth) into multiple orthogonal subcarriers, which are also called tones, bins, etc. Each subcarrier may be modulated with data. In general, modulation symbols are sent on the subcarriers in the frequency domain with OFDM and in the time domain with SC-FDMA. OFDM is used in various systems such as MediaFLO, DVB-H and ISDB-T broadcast systems, IEEE 802.11a/g WLAN systems, and some cellular systems. Certain aspects and configurations of a narrow-band interference canceller are described below for a broadcast system that uses OFDM, e.g., a MediaFLO system.

Figure 1:
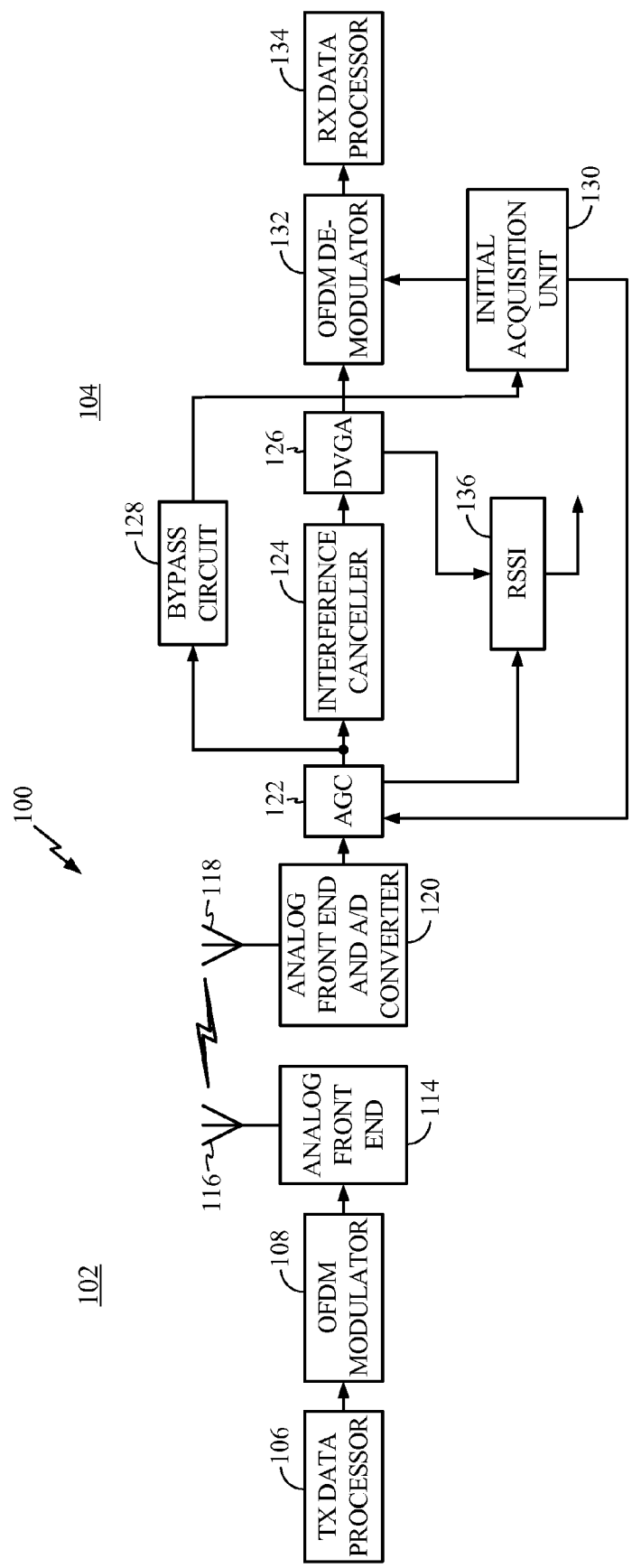
FIG. 1 is a block diagram of a transmitter and receiver in a wireless communications system.

FIG. 1 is a high-level block diagram of a transmitter 102 and receiver 104 in a wireless communications system 100. The transmitter 102 may be part of a base station, and the receiver 104 may be part of an access terminal. Conversely, the transmitter 102 may be part of an access terminal, and the receiver 104 may be part of a base station. A base station is typically a fixed station and may also be called a base transceiver system (BTS), an access point, a Node B, or some other terminology. An access terminal may be fixed or mobile and may also be called a handset, wireless communications device, wireless telephone, cellular telephone, user terminal, user equipment, mobile station, mobile unit, subscriber unit, subscriber station, wireless station, mobile radio, radio telephone, wireless device, or some other terminology. The access terminal may be a mobile telephone, a personal digital assistant (PDA), a laptop computer, a wireless modem, a pager, a camera, a game console, a MP3 player, or any other video, audio, or data device.

At transmitter 102, a transmit (TX) data and pilot processor 106 processes (e.g., encodes, interleaves, and symbol maps) traffic data and generates data symbols. The TX data and pilot processor 106 also generates pilot symbols. As used herein, a data symbol is a modulation symbol for data, a pilot symbol is a modulation symbol for pilot, and a modulation symbol is a complex value for a point in a signal constellation (e.g., for PSK or QAM). An OFDM modulator 108 multiplexes the data symbols and pilot symbols, performs OFDM modulation on the multiplexed data and pilot symbols, and generates OFDM symbols. An analog front end (AFE) 114 processes (e.g., converts to analog, amplifies, filters, and frequency upconverts) the OFDM symbols and generates a modulated signal, which is transmitted via an antenna 116.

In one configuration of a TX pilot processor 110 residing in a base station, two time-division multiplexed (TDM) pilots are generated. The first TDM pilot (or "TDM pilot 1") is a pilot generated with a first pseudo-random number (PN) sequence (or "PN1" sequence) and the second TDM pilot (or "TDM pilot 2") is a pilot generated with a second PN sequence (or "PN2" sequence). Each base station is assigned a specific PN2 sequence that uniquely identifies the base station among neighboring base stations. A receiver in an access terminal may use the TDM pilot 1 to detect for the presence of a signal, obtain a coarse timing estimate, and estimate the frequency error. The receiver may use the TDM pilot 2 to identify the specific base station transmitting the TDM pilot 2 and fine tune the coarse timing estimate.

At the receiver 104, an antenna 118 receives the modulated signal from the transmitter 102 and provides it to an AFE 120. The AFE 120 processes the modulated signal (e.g., filters, amplifies, and frequency downconverts) to obtain a baseband signal and further digitizes the signal to obtain digital samples of the baseband signal. An automatic gain control (AGC) circuit 122 adjusts the gain of the AFE 120 and multiplies the samples with a digital variable gain to produce samples having a desired average power (i.e., a power setpoint).

An interference canceller 124 removes narrow-band interference from the samples. After canceling the narrow-band interference, depending on the signal-to-interference ratio, the average power is reduced and can be variable. This could have a negative impact on downstream processing. To maintain a constant signal power level after removing narrow-band interference, a digital variable gain amplifier (DVGA) 126 is used to amplify the output of the interference canceller 124 to the power setpoint. In a manner to be described in greater detail later, a bypass circuit 126 may be used to bypass the interference canceller 124 and DVGA 126 when the narrow-band interference is weak or non-existent. The bypass circuit 126 may determine that the narrow-band interference is weak when the gain of the DVGA is close to unity or below some other threshold. When bypassed, the bypass circuit 126 may also disable the interference canceller 124 and DVGA to reduce power consumption.

An initial acquisition unit 130 is responsible for signal acquisition and coarse time and frequency synchronization. The samples are correlated with a delayed pilot sequence and the result compared to one or more parameters to detect the presence of the pilot sequence in the received signal and the timing. In one configuration of an initial acquisition unit 130 utilizing two time-division multiplexed pilots, the samples are correlated with a delayed TDM pilot 1 sequence. The result is compared with any number of parameters to detect the presence the signal from the transmitter 102, an estimate of the frequency offset, and a coarse estimate of timing. The parameters may include, by way of example, the height, width and slope of the signal peak generated by the correlator. In a manner to be described in greater detail later, the TDM pilot 1 parameters may be adjusted based on the strength of the narrow-band interference.

An OFDM demodulator 132 performs OFDM demodulation on the samples and produces data symbol estimates, which are estimates of the data symbols sent by transmitter 102. The OFDM demodulator 132 provides the data symbol estimates to a receive (RX) data processor 134. The RX data processor 134 processes (e.g., symbol demaps, deinterleaves, and decodes) the data symbol estimates and produces decoded data.

Figure 2:
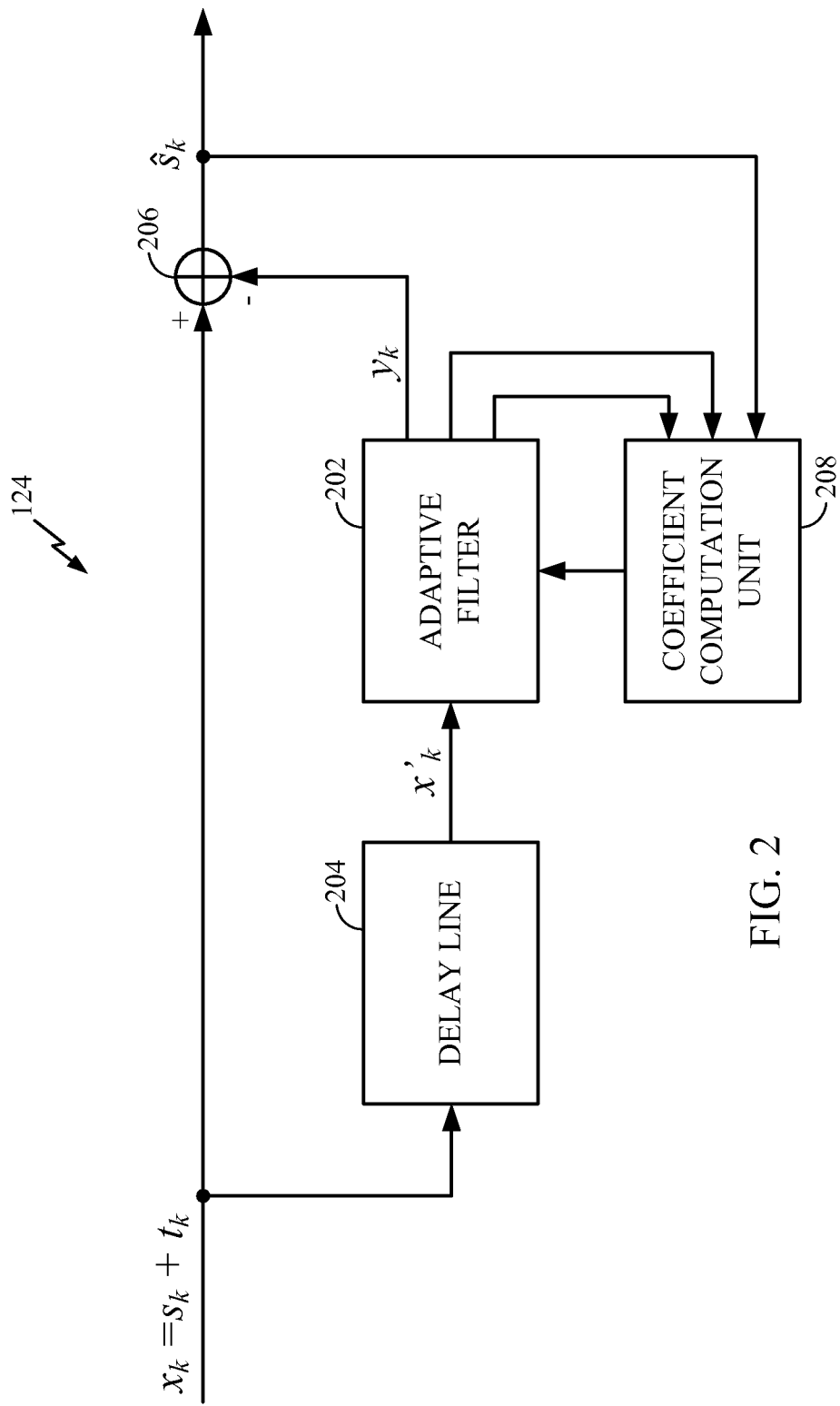
FIG. 2 is a block diagram of an interference canceller.

FIG. 2 is a functional block diagram of an interference canceller 124. The interference canceller 124 includes an adaptive filter 202 of length L, with coefficients $w_0^{(n)}$, $w_1^{(n)}, \ldots w_{L-1}^{(n)}$, where the superscript denotes the adaptation cycle. The length L may be programmable. The samples input to the interference canceller are represented by $x_k$, which is a combination of the useful received signal $s_k$ and a narrow-band interference $t_k$. The input samples serve to provide a reference about the undesired component $t_k$. In this example, the reference samples $x_k'$ are derived by delaying the input samples $x_k$ with a delay line 204. Note that delaying the input does not distort the reference to the narrow-band component $t_k$, since it is time-periodic. In general, other types of references are possible.

The adaptive filter is used to model the undesired component $t_k$ as closely as possible, given its reference $x_k'$. This is possible using the structure showed in FIG. 2, under the assumption that the desired signal $s_k$ and the undesired interference $t_k$ are mutually uncorrelated (statistically independent). Once this approximation $y_k$ is available, it is subtracted from the input samples $x_k$ using a subtractor 206 to obtain $\hat{s}_k$, the best estimate of the OFDM symbols $s_k$. The adaptation of the coefficients $w^{(n)}$ over time is achieved using a coefficient computation unit 208. In one configuration of the interference canceller 124, the coefficient computation unit 208 computes the coefficients $w^{(n)}$ using a least means squared (LMS) algorithm to minimize the norm of $\hat{s}_k$. The solution $\hat{s}_k$ with the minimum norm then corresponds to the best "guess" about the OFDM symbols $s_k$, given the input samples $x_k$.

Figure 3:
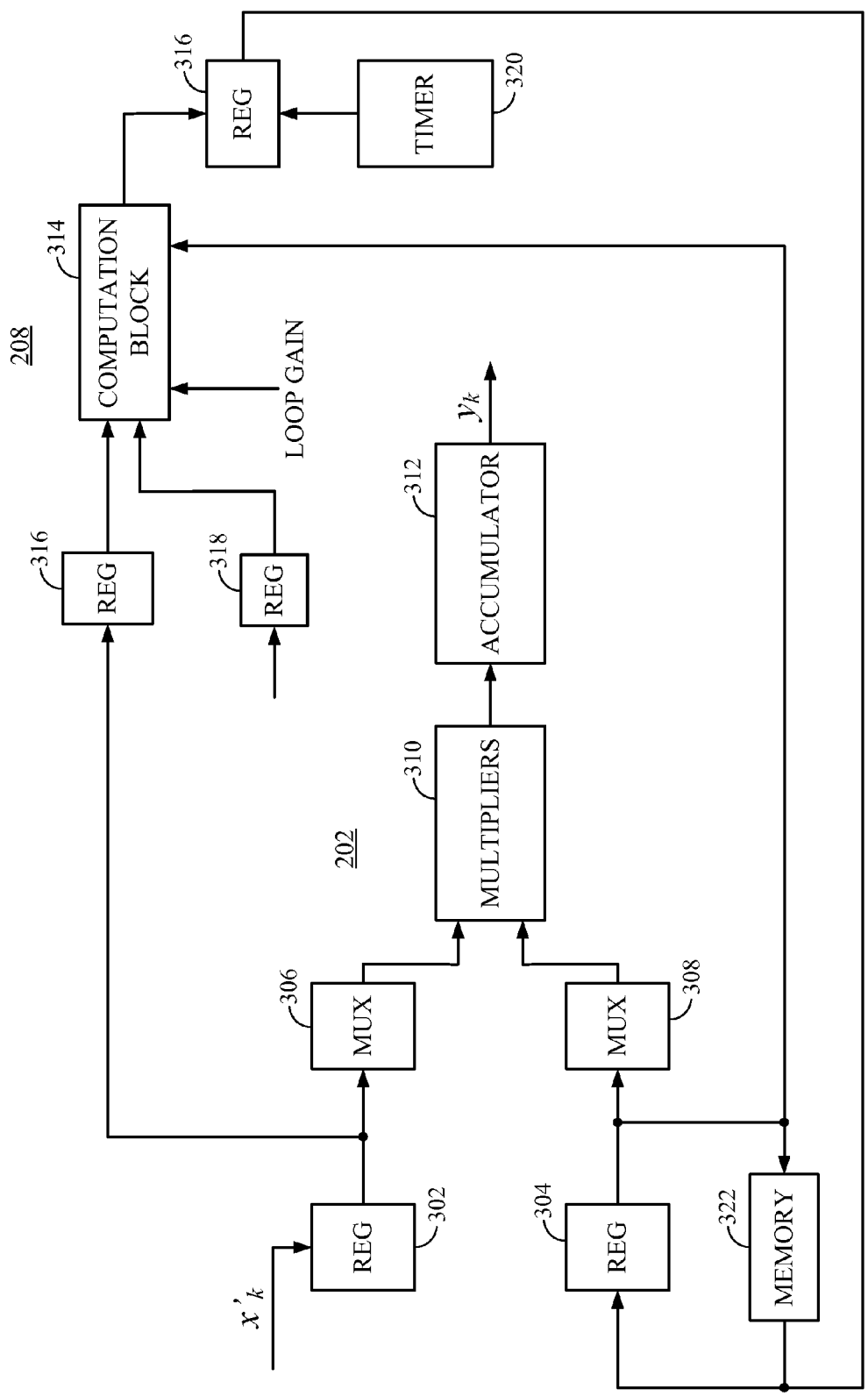
FIG. 3 is a block diagram of an adaptive filter and an coefficient computation unit in an interference canceller.

FIG. 3 is a block diagram of an adaptive filter and coefficient computation block in an interference canceller. In this example, reference samples $x_k'$ are serially shifted into a sample register 302 in the adaptive filter 202. The reference samples $x_k'$ in the sample register 302 are multiplied with the filter coefficients $w_k^{(n)}$ in a coefficient register 304 to produce an estimate $y_k$ of the undesired component $t_k$, where:

$$y_k = \sum_{m=0}^{L} x'(k-m) \cdot w(m) \tag{1}$$

Equation 1 requires the addition of L multiplication products to produce the estimate $y_k$. This may be achieved with L multipliers and an L-input adder. Alternatively, a multiplexing scheme may be used to reduce the hardware requirements. By way of example, the hardware requirements may be reduced by accumulating N pipelined multiplication operations, with each multiplication operation producing L/N filter coefficients. In this example, the number of multipliers can be reduced to L/N multipliers. In operation, two multiplexers 306, 308 provide the first L/N reference samples $x_k'$ from the sample register 302 and the first L/N filter coefficients $w_k^{(n)}$ from the coefficient register 304 to the L/N multipliers 310 during a first clock cycle. The resulting L/N multiplication products are provided to an accumulator 312 for addition. During the next clock cycle, the two multiplexers 306, 308 provide the next L/N reference samples $x_k'$ from the sample register 302 and the next L/N filter coefficients $w_k^{(n)}$ from the coefficient register 304 to the L/N multipliers 310 to produce a second set of L/N multiplication products, which are also provided to the accumulator 312 for addition. This process is repeated for N clocks cycles to produce L multiplication products that are added together in a pipeline fashion by the accumulator 312 to produce the estimate $y_k$. This process can be employed whenever the rate of the input samples $x_k$ is at least N times slower than the clock rate.

A computation block 314 uses the reference samples $x_k$, the current filter coefficients $w_k^{(n)}$, and the filtered samples $\hat{s}_k$ output from the interference canceller 124 to update the filter coefficients $w_k^{(n-1)}$. In this example, the computation block 314 computes the filter coefficients as follows:

$$w_k^{(n+1)} = w_k^{(n)} + 2\mu \cdot \hat{s}_k \cdot \text{conj}(x_k') \qquad (2)$$

where conj(.) denotes the complex conjugate operation and $2\mu$ is the loop gain.

The reference samples $x_k'$ are loaded from the sample register 302 in the adaptive filter 202 into a register 316 and a filtered sample $\hat{s}_k$ output from the interference canceller 124 is loaded into a register 318. In order to reduce the hardware requirements of the computation block, the L updated filter coefficients $w_k^{(n+1)}$ are computed serially. During each clock cycle, a reference sample $x_k'$ from the register 316, a filter coefficient $w_k^{(n)}$ from the coefficient register 304, and the filtered sample $\hat{s}_k$ from the latch 318 are provided to the computation block 314 to update a single filter coefficient $w_k^{(n+1)}$.

Figure 4:
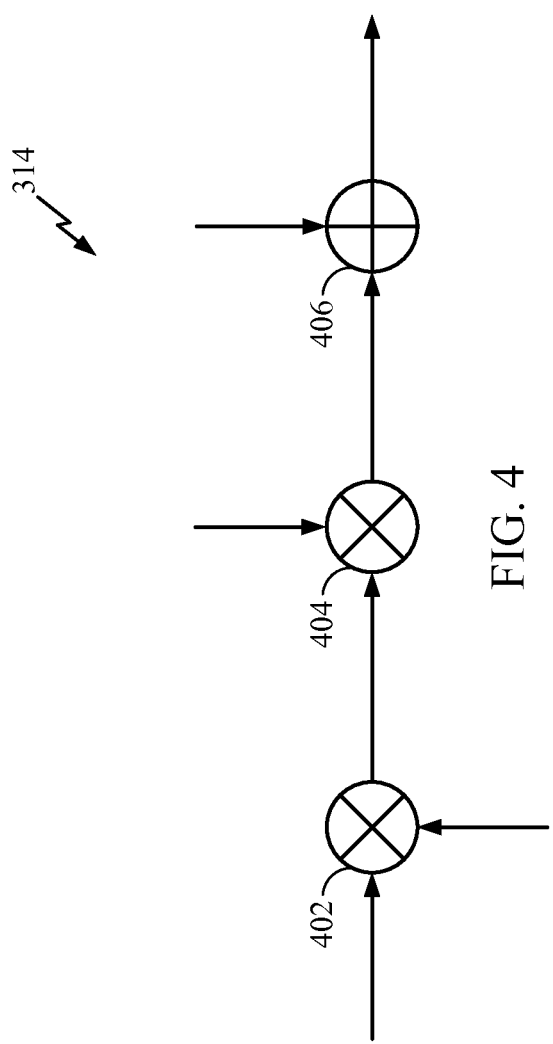
FIG. 4 is a model of a computation block in a coefficient computation unit.

Referring to FIG. 4, the computation block 314 includes a complex multiplier 402 to multiply the reference sample $x_k'$ with the filtered sample $\hat{s}_k$, a multiplier 404 to scale the output of the complex multiplier 402 by the loop gain $2\mu$, and an adder 406 to add a filter coefficient $w_k^{(n)}$ to the result to produce an updated filter coefficient $w_k^{(n+1)}$.

Returning to FIG. 3, each filter coefficient $w_k^{(n+1)}$ updated by the computation block 314 is serially shifted into register 316 until the register contains all L updated filter coefficients $w_k^{(n+1)}$. A timer 320 loads the L updated filter coefficients $w_k^{(n+1)}$ from the register 316 in the coefficient computation unit 208 to the coefficient register 304 in the adaptive filter 202. The timer 320 may be fixed or variable. In the case of a variable timer, the timer 320 may be programmed by the equipment manufactured or varied during operation by a processor (not shown) in response to current operating conditions. This means that the update frequency of the filter coefficients $w_k^{(n+1)}$ may be different for each receiver and/or may vary over time within a single receiver.

In one configuration, the adaptive filter 202 supports multiple operating modes (e.g., an acquisition mode and a tracking mode). In the acquisition mode, the filter coefficient updates are performed with a relatively large loop gain $2\mu$ to achieve faster convergence. This might be advantageous, for example, when the access terminal first powers up. Once the filter coefficients $w_k^{(n)}$ are converged, the adaptive filter 202 switches to the tracking mode. In the tracking mode, the filter coefficients $w_k^{(n)}$ are modified with a lower loop gain $2\mu$ to achieve a good balance between rate of convergence and time averaging. The update rate can also be reduced in tracking mode, in order to minimize the jitter-effects and conserve power.

Returning to FIG. 1, a received signal strength indicator (RSSI) computation block 136 determines the strength of the received signal. The resulting RSSI has a number of uses in the receiver 102. The signal strength indicator on a cellular phone is a common example of how the RSSI may be used. The RSSI may also be used by receivers with a power control link with a transmitter. In the configuration shown in FIG. 1, the gain of the primary DVGA in the AGC 122 and the loop gain d(n) from the DVGA 126 are used by the computation unit 136 to provide a RSSI that excludes the power of the narrow-band interference.

In a broadcast system, where the receiver resides in the access terminal, the AFE 120 may occasionally, or frequently, tune to another RF channel broadcasting the same content to improve reception as the access terminal moves through the access network. Before the AFE 120 tunes to another RF channel, it needs to determine whether the signal strength on that channel is sufficient. The ability to make this determination is enhanced if the signal strength measurement is made after the narrow-band interference is removed. The RSSI computed by the computation block 136 may be used for this purpose.

When the AFE 120 (see FIG. 1) tunes to another RF channel, the adaptive filter 202 may be switched to the acquisition mode to achieve faster convergence of the filter coefficients. In one configuration of the adaptive filter 202, the filter coefficients $w_k^{(n)}$ in the coefficient register 304 may be backed up in memory 322 when the AFE 120 (see FIG. 1) is tuned to a new channel. In this configuration, the filter coefficients $w_k^{(n)}$ backed up in memory 322 may be restored in the coefficient register 304 when the AFE 120 (see FIG. 1) is switched back to the original RF channel, thus reducing the acquisition time of the adaptive filter 202. The portion of the memory 322 storing the filter coefficients $w_k^{(n)}$ may be considered functionally as part of the adaptive filter 202, but physically may be located anywhere in the receiver.

Figure 5:
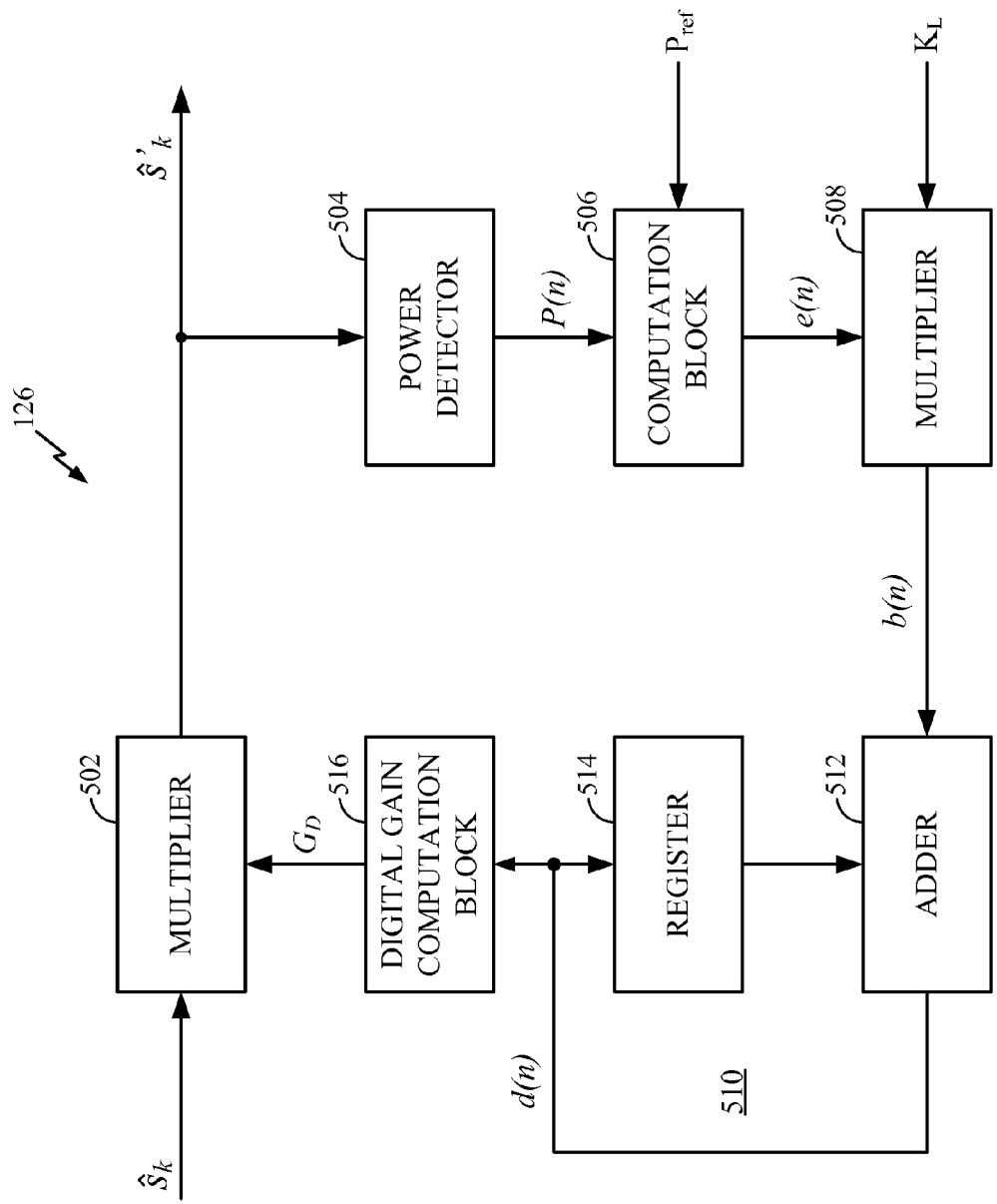
FIG. 5 is a block diagram of a digital variable gain amplifier (DVGA)

FIG. 5 is a functional block diagram of a DVGA. An example of the DVGA 126 will now be described for operation in the logarithmic domain, however, those skilled in the art will readily understand that the DVGA 126 may be implemented in the linear domain. In this example, a multiplier 502 multiplies the filtered samples $\hat{s}_k$ input to the DVGA 126 with a variable digital gain $G_D$ to produce output samples $\hat{s}_k'$ at the power setpoint. A power detector 504 determines the power of the output samples $\hat{s}_k'$ and provides power measurements P(n) to an error computation block 506, where n is an index for the update interval for the DVGA 126. The error computation block 506 determines the error e(n) between the measured power P(n) and a reference power level $P_{ref}$, which is referred to as the power setpoint. A multiplier 508 multiplies the error e(n) with a loop gain $K_L$ and produces a scaled error b(n). A loop filter 510 filters the scaled error b(n) and produces a loop gain d(n) (i.e., a value approximating the power of the filtered samples $\hat{s}_k$ input to the DVGA 126 relative to the power setpoint). Within the loop filter 510, an adder 512 sums the scaled error b(n) with the loop gain d(n−1) from the previous update interval stored in a register 514 to generate the updated loop gain d(n). The loop gain d(n) is provided to the digital gain computation unit 516. Based on the loop gain d(n), the digital gain computation unit 516 selects a suitable digital gain $G_D$ to multiply the filtered samples $\hat{s}_k$ input to the DVGA 126 such that the average power of the output samples $\hat{s}_k'$ is maintained at or near the power setpoint.

Returning to FIG. 1, various indicators in the interference canceller 124 and the DVGA 126 may be used to determine the strength of the narrow-band interference. The Fourier transform of the filter coefficients $w_k^{(n)}$ from the interference canceller 124 is just one example. The location of narrow-band interference can be determined from the filter coefficients $w_k^{(n)}$ by processing in either the time or frequency domain. A good indicator of the narrow-band interference strength is the magnitude of the loop gain d(n) from the DVGA 126. These indicators, either alone or combination, may be used to optimize receiver performance. By way of example, these indicators may be used to control the bypass circuit 128, bypassing and disabling the interference canceller 124 and the DVGA 126 when the narrow-band interference is weak or non-existent.

These indicators may also be used to adjust one or more parameters used by the coarse acquisition unit 130 to detect the pilot sequence. By way of example, the indicators may be used to adjust the parameters that are applied against the height, width and slope of the signal peak output resulting from the correlation of the samples and the locally stored replica of the TDM pilot 1. During periods of strong narrow-band interference, these indicators may be used to adjust the parameters used to detect the pilot sequence. Those skilled in the art will readily understand how best to optimize the adjustment of the parameters to detect the pilot sequence depending on the level of narrow-band interference experience by the receiver.

Figure 6:
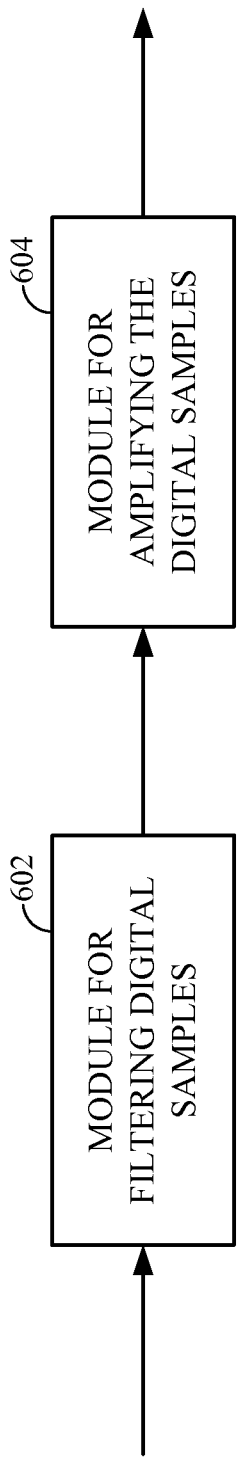
FIG. 6 is a functional block diagram of a portion of a receiver in a wireless communications system.

FIG. 6 is a functional block diagram of a receiver in a wireless communications system. The receiver 104 includes a module 602 for filtering digital samples produced from a modulated signal transmitted over a wireless channel. The receiver 104 also includes a module 604 for amplifying the filtered digital samples with a variable digital gain.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A receiver, comprising:
    an automatic gain control circuit, including a first digital variable gain amplifier (DVGA), configured to output digital samples based on a received signal;
    an interference canceller configured to filter the digital samples using an algorithm to reduce narrowband interference;
    a second DVGA configured to amplify the filtered digital samples; and
    a bypass circuit configured to bypass the interference canceller when a gain of the second DVGA is in close proximity to unity.

2. The receiver of claim 1 wherein the digital samples input to the interference canceller have a higher power level than the filtered digital samples output by the interference canceller, and further comprising second DVGA configured to amplify the filtered digital samples to restore the power level.

3. The receiver of claim 1 wherein the interference canceller comprises:
    an adaptive filter responsive to filter coefficients; and
    a computation unit configured to update the filter coefficients using a variable loop gain algorithm.

4. The receiver of claim 3 wherein the adaptive filter is configured to operate in an acquisition mode and a tracking mode, and wherein the computation unit is further configured to set the loop gain higher in the acquisition mode than in the tracking mode.

5. The receiver of claim 4 wherein the adaptive filter is further configured to operate in the acquisition mode in response to a change to another wireless channel and switch to the tracking mode once the coefficients converge.

6. The receiver of claim 4 wherein the adaptive filter is further configured to operate in the acquisition mode on power-up and switch to the tracking mode once the coefficients converge.

7. The receiver of claim 1 wherein the interference canceller comprises:
    an adaptive filter responsive to filter coefficients; and
    a computation unit configured to update the filter coefficients at a variable rate.

8. The receiver of claim 1 wherein the interference canceller comprises an adaptive filter configured to backup filter coefficients in response to a change from a first wireless channel to a second wireless channel and to restore the filter coefficients in response to a further change back to the first wireless channel.

9. The receiver of claim 1 wherein the interference canceller comprises:
an adaptive filter responsive to filter coefficients; and
a computation unit configured to update the filter coefficients for the adaptive filter; and
wherein the receiver further comprises:
a bypass circuit configured to bypass the interference canceller and the second DVGA, the bypass circuit being responsive to at least one of an input from the second DVGA and the filter coefficients.

10. The receiver of claim 9 wherein the bypass circuit is further configured to disable the interference canceller and the second DVGA when the interference canceller and second DVGA are bypassed.

11. The receiver of claim 9 wherein the bypass circuit is further configured to bypass the interference canceller and the second DVGA, once the gain of the second DVGA drops below a threshold.

12. The receiver of claim 1 further comprising an initial acquisition unit configured to detect the presence of a time division multiplexed pilot signal, at least one of the interference canceller and the second DVGA being configured to control a parameter used by the initial acquisition unit to detect the pilot.

13. The receiver of claim 1 further comprising a received signal strength indication (RSSI) computation unit configured to compute the received signal strength of the received signal based on inputs from an automatic gain control and the second DVGA.

14. The receiver unit of claim 13 further comprising an analog front end configured to use the RSSI to determine whether to handoff to another wireless channel.

15. The receiver of claim 1 wherein the interference canceller comprises an adaptive filter having a length, and a computation unit configured to update a plurality of filter coefficients for the adaptive filter, the adaptive filter being configured to multiplex the digital samples and the filter coefficients to a plurality of multipliers, the number of multipliers being less than the length of the adaptive filter.

16. The receiver of claim 1 wherein the interference canceller comprises an adaptive filter, and a computation unit configured to update a plurality of filter coefficients for the adaptive filter, the filter coefficients being updated in a serial manner.

17. The receiver of claim 1, wherein the algorithm is a least mean squares algorithm.

18. A method of canceling interference in a receiver, comprising:
modulating a received signal to generate digital samples;
amplifying the digital samples using a digital variable gain amplifier (DVGA);
filtering the digital samples using an interference canceller that utilizes an algorithm to reduce narrowband interference; and
bypassing the interference canceller when a gain of the DVGA is in close proximity to unity.

19. The method of claim 18 wherein the digital samples have a higher power level than the filtered digital samples, and further comprising amplifying the filtered digital samples with a variable digital gain to restore the power level.

20. The method of claim 18 wherein the step of filtering comprises using an adaptive filter, response to filter coefficients, using an algorithm having a variable loop gain.

21. The method of claim 20 wherein the step of filtering comprises using an acquisition mode with a first loop gain or a tracking mode with a second loop gain that is lower than the first loop gain.

22. The method of claim 18 wherein the filter coefficients are updated at different rates.

23. The method of claim 18 further comprising:
backing up the filter coefficients in response to switching from a first wireless channel to a second wireless channel; and
restoring the filter coefficients in response to switching to the first wireless channel.

24. The method of claim 8 further comprising processing the digital samples without the steps of filtering in response to a drop in the level of interference.

25. The method of claim 18 further comprising detecting the presence of a time division multiplexed pilot signal transmitted in the wireless signal, and adjusting a parameter used to detect the presence of the time division multiplexed pilot signal in response to a change in the level of interference.

26. The method of claim 18 further comprising computing the received signal strength of the wireless signal, the computation excluding the power of narrow-band interference.

27. The method of claim 26 further comprising using the computed received signal strength to determine whether to handoff to another wireless channel.

28. A receiver, comprising:
automatic gain control means for outputting amplified digital samples based on a received signal;
means for filtering the digital samples using an algorithm to reduce narrowband interference;
means for amplifying the filtered digital samples; and
means for bypassing the means for filtering when a gain of the means for amplifying is in close proximity to unity.

29. The receiver of claim 28 wherein the digital samples have a first power level and the filtered digital samples have a second power level less than the first power level, and further comprising means for amplifying the filtered digital samples with a variable digital gain based on the first power level to increase the power level of the filtered digital samples.

30. The receiver of claim 28 wherein the means for filtering digital samples comprises means for adaptively filtering the digital samples using a plurality of filter coefficients and means for updating the filter coefficients using an algorithm having a variable loop gain.

31. The receiver of claim 30 wherein the means for filtering digital samples further comprises means for operating in an acquisition mode and a tracking mode, and wherein the means for updating the filter coefficients comprises means for setting the loop gain higher in the acquisition mode than in the tracking mode.

32. The receiver of claim 28 wherein the means for filtering digital samples comprises means for adaptively filtering the digital samples using a plurality of filter coefficients and means for updating the filter coefficients at a variable rate.

33. The receiver of claim 28 wherein the means for filtering digital samples comprises means for adaptively filtering the digital samples using a plurality of filter coefficients and means for backing up the filter coefficients in response to a change to another wireless channel and restoring the filter coefficients in response to a change back to the wireless channel.

34. The receiver of claim 28 further comprising means for bypassing the means for filtering digital samples in response to a drop in the level of interference.

35. The receiver of claim 34 further comprising means for disabling the means for filtering digital samples when bypassed.

36. The receiver of claim 28 further comprising means for detecting a pilot transmitted in the received signal, and means for adjusting a parameter used to detect the pilot in response to a change in the level of interference.

37. The receiver of claim 28 further comprising means for computing the received signal strength of the received signal, the computation excluding the power of narrow-band interference.

38. The receiver of claim 37 further comprising means for using the computed received signal strength to determine whether to handoff to another wireless channel.

39. A non-transitory computer readable medium comprising instructions for canceling interference in a receiver, the instructions comprising:
 modulating a received signal to generate digital samples;
 amplifying the digital samples using a variable gain amplifier (DVGA);
 filtering the digital samples using an algorithm to reduce narrowband interference; and
 bypassing filtering the digital samples when a gain of the DVGA is in close proximity to unity.

40. The non-transitory computer readable medium of claim 39 wherein the digital samples have a higher power level than the filtered digital samples, and further comprising instructions for amplifying the filtered digital samples with a variable digital gain to restore the power level.

41. The non-transitory computer readable medium of claim 39 wherein the instruction for filtering comprises using an adaptive filter, response to filter coefficients, using an algorithm having a variable loop gain.

42. The non-transitory computer readable medium of claim 41 wherein the instruction for filtering comprises using an acquisition mode with a first loop gain or a tracking mode with a second loop gain that is lower than the first loop gain.

43. The non-transitory computer readable medium of claim 39 wherein the filter coefficients are updated at different rates.

44. The non-transitory computer readable medium of claim 39 further comprising instructions for:
 backing up the filter coefficients in response to switching from a first wireless channel to a second wireless channel; and
 restoring the filter coefficients in response to switching to the first wireless channel.

45. The non-transitory computer readable medium of claim 39 further comprising instructions for processing the digital samples without the steps of filtering in response to a drop in the level of interference.

46. The non-transitory computer readable medium of claim 39 further comprising instructions for detecting the presence of a time division multiplexed pilot signal transmitted in the received signal, and adjusting a parameter used to detect the presence of the time division multiplexed pilot signal in response to a change in the level of interference.

47. The non-transitory computer readable medium of claim 39 further comprising instructions for computing the received signal strength of the wireless signal, the computation excluding the power of narrow-band interference.

48. The non-transitory computer readable medium of claim 47 further comprising instructions for using the computed received signal strength to determine whether to handoff to another wireless channel.

49. The method of claim 20, wherein the step of filtering further comprises operating in the acquisition mode in response to a change to another wireless channel and switching to the tracking mode once the coefficients converge.

50. The method of claim 20, wherein the step of filtering further comprises operating in the acquisition mode on power-up and switching to the tracking mode once the coefficients converge.

51. The method of claim 18, wherein the step of filtering is responsive to filter coefficients, and further comprising:
 computing updated filter coefficients; and bypassing the interference canceller and the DVGA in response to at least one of an input from the DVGA and the filter coefficients.

52. The method of claim 51, wherein the interference canceller and the DVGA are disabled when the interference canceller and DVGA are bypassed.

53. The method of claim 17, wherein the step of filtering comprises multiplexing the digital samples and a plurality of filter coefficients to a plurality of multipliers, the number of multipliers being less than an adaptive filter length.

54. The method of claim 17, further comprising updating a plurality of filter coefficients in a serial manner.

55. The receiver of claim 30, wherein the means for filtering digital samples is further configured to operate in the acquisition mode in response to a change to another wireless channel and switch to the tracking mode once the coefficients converge.

56. The receiver of claim 30, wherein the means for filtering digital samples is further configured to operate in the acquisition mode on power-up and switch to the tracking mode once the coefficients converge.

57. The receiver of claim 28, wherein the means for filtering is responsive to filter coefficients, and further comprising:
 means for bypassing the means for filtering and the means for amplifying in response to at least one of an input from the means for amplifying and the filter coefficients.

58. The receiver of claim 27, wherein the means for filtering comprises means for multiplexing the digital samples and a plurality of filter coefficients to a plurality of multipliers, the number of multipliers being less than an adaptive filter length.

59. The receiver of claim 27, wherein the means for filtering comprises means for updating a plurality of filter coefficients in a serial manner.

60. The non-transitory computer readable medium of claim 41, wherein the instruction for filtering further comprises operating in the acquisition mode in response to a change to another wireless channel and switching to the tracking mode once the coefficients converge.

61. The non-transitory computer readable medium of claim 41, wherein the instruction for filtering further comprises operating in the acquisition mode on power-up and switching to the tracking mode once the coefficients converge.

62. The non-transitory computer readable medium of claim 39, wherein the instruction for filtering is responsive to filter coefficients, and further comprising instructions for:
 computing updated filter coefficients; and
 bypassing an interference canceller and the DVGA in response to at least one of an input from the DVGA and the filter coefficients.

63. The non-transitory computer readable medium of claim 62, wherein the instruction for bypassing disables the interference canceller and the DVGA when the interference canceller and DVGA are bypassed.

64. The non-transitory computer readable medium of claim 38, wherein the instruction for filtering comprises multiplexing the digital samples and a plurality of filter coefficients to a plurality of multipliers, the number of multipliers being less than an adaptive filter length.

65. The non-transitory computer readable medium of claim 38, wherein the instruction for filtering comprises updating a plurality of filter coefficients in a serial manner.

66. The method of claim 17, wherein the algorithm is a least mean squares algorithm.

67. The receiver of claim 27, wherein the algorithm is a least mean squares algorithm.

68. The non-transitory computer readable medium of claim 38, wherein the algorithm is a least mean squares algorithm.

* * * * *